(12) United States Patent
Miyoshi et al.

(10) Patent No.: US 10,919,809 B2
(45) Date of Patent: Feb. 16, 2021

(54) MNZN FERRITE AND ITS PRODUCTION METHOD

(71) Applicant: HITACHI METALS, LTD., Tokyo (JP)

(72) Inventors: Yasuharu Miyoshi, Tokyo (JP); Norikazu Koyuhara, Tokyo (JP); Tomoyuki Tada, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 337 days.

(21) Appl. No.: 16/087,224

(22) PCT Filed: Mar. 24, 2017

(86) PCT No.: PCT/JP2017/011931
§ 371 (c)(1),
(2) Date: Sep. 21, 2018

(87) PCT Pub. No.: WO2017/164350
PCT Pub. Date: Sep. 28, 2017

(65) Prior Publication Data
US 2019/0062217 A1    Feb. 28, 2019

(30) Foreign Application Priority Data
Mar. 25, 2016  (JP) .................. 2016-061925

(51) Int. Cl.
*C04B 35/26* (2006.01)
*H01F 1/34* (2006.01)
(Continued)

(52) U.S. Cl.
CPC .......... *C04B 35/2658* (2013.01); *C01G 49/00* (2013.01); *C04B 35/6262* (2013.01);
(Continued)

(58) Field of Classification Search
CPC ......... C04B 35/2658; C04B 2235/6565; H01F 1/344
See application file for complete search history.

(56) References Cited

U.S. PATENT DOCUMENTS

| | | | |
|---|---|---|---|
| 6,940,381 B2 | 9/2005 | Watanabe et al. | |
| 8,158,018 B2 * | 4/2012 | Nakahata | H01F 1/344 |
| | | | 252/62.62 |

(Continued)

FOREIGN PATENT DOCUMENTS

| | | |
|---|---|---|
| EP | 1816111 A1 | 8/2007 |
| JP | 3-268404 A | 11/1991 |

(Continued)

OTHER PUBLICATIONS

V.T. Zaspalis et al., "The effect of dopants on the incremental permeability of MnZn-ferrites", Journal of Magnetism and Magnetic Materials, vol. 313, 2007, pp. 29-36 (8 pages total).

(Continued)

*Primary Examiner* — C Melissa Koslow
(74) *Attorney, Agent, or Firm* — Sughrue Mion, PLLC

(57) ABSTRACT

A method for producing MnZn ferrite comprising Fe, Mn and Zn as main components, and Ca, Si and Co, and at least one selected from the group consisting of Ta, Nb and Zr as sub-components, comprising a step of molding a raw material powder for the MnZn ferrite to obtain a green body, and a step of sintering the green body; the sintering step comprising a temperature-elevating step, a high-temperature-keeping step, and a cooling step; the cooling step including a slow cooling step of cooling in a temperature range of 1100° C. to 1250° C. at a cooling speed of 0° C./hour to 20° C./hour for 1 hours to 20 hours, and a cooling speed before and after the slow cooling step being higher than 20° C./hour; the MnZn ferrite having a volume resistivity of 8.5 Ω·m or more at room temperature, an average crystal grain (Continued)

size of 7 μm to 15 μm, and core loss of 420 kW/m$^3$ or less between 23° C. and 140° C. at a frequency of 100 kHz and an exciting magnetic flux density of 200 mT.

6 Claims, 1 Drawing Sheet

(51) Int. Cl.
*C01G 49/00* (2006.01)
*H01F 41/02* (2006.01)
*C04B 35/626* (2006.01)
*H01F 1/03* (2006.01)

(52) U.S. Cl.
CPC ............ *H01F 1/0315* (2013.01); *H01F 1/34* (2013.01); *H01F 1/344* (2013.01); *H01F 41/02* (2013.01); *C04B 2235/3208* (2013.01); *C04B 2235/3244* (2013.01); *C04B 2235/3251* (2013.01); *C04B 2235/3275* (2013.01); *C04B 2235/3418* (2013.01); *C04B 2235/401* (2013.01); *C04B 2235/404* (2013.01); *C04B 2235/405* (2013.01); *C04B 2235/5436* (2013.01); *C04B 2235/602* (2013.01); *C04B 2235/656* (2013.01); *C04B 2235/6562* (2013.01); *C04B 2235/6565* (2013.01); *C04B 2235/6567* (2013.01); *C04B 2235/6583* (2013.01); *C04B 2235/786* (2013.01); *C04B 2235/83* (2013.01); *C04B 2235/96* (2013.01); *C04B 2235/9607* (2013.01)

(56) References Cited

U.S. PATENT DOCUMENTS

| | | |
|---|---|---|
| 2004/0130429 A1 | 7/2004 | Watanabe et al. |
| 2008/0007377 A1 | 1/2008 | Ishiwaki et al. |
| 2009/0242827 A1 | 10/2009 | Nakahata et al. |
| 2017/0278607 A1 | 9/2017 | Tada et al. |
| 2017/0352455 A1* | 12/2017 | Koyuhara ................. H01F 1/36 |
| 2019/0096554 A1* | 3/2019 | Koyuhara ............. H01F 27/255 |

FOREIGN PATENT DOCUMENTS

| | | |
|---|---|---|
| JP | 5-217734 A | 8/1993 |
| JP | 7-297017 A | 11/1995 |
| JP | 2001-220146 A | 8/2001 |
| JP | 2007-031240 A | 2/2007 |
| JP | 2007-070209 A | 3/2007 |
| JP | 2007-112695 A | 5/2007 |
| JP | 2008-169072 A | 7/2008 |
| JP | 2012-096961 A | 5/2012 |
| WO | 2016/032001 A1 | 3/2016 |

OTHER PUBLICATIONS

J.Topfer et al., "Microstructural effects in low loss power ferrites", Journal of the European Ceramic Society, vol. 25, 2005, pp. 3045-3049 (6 pages total).
Communication dated Jul. 15, 2019, from the European Patent Office in counterpart application No. 17770390.7.
International Search Report for PCT/JP2017/011931 dated Jun. 27, 2017 [PCT/ISA/210].

* cited by examiner

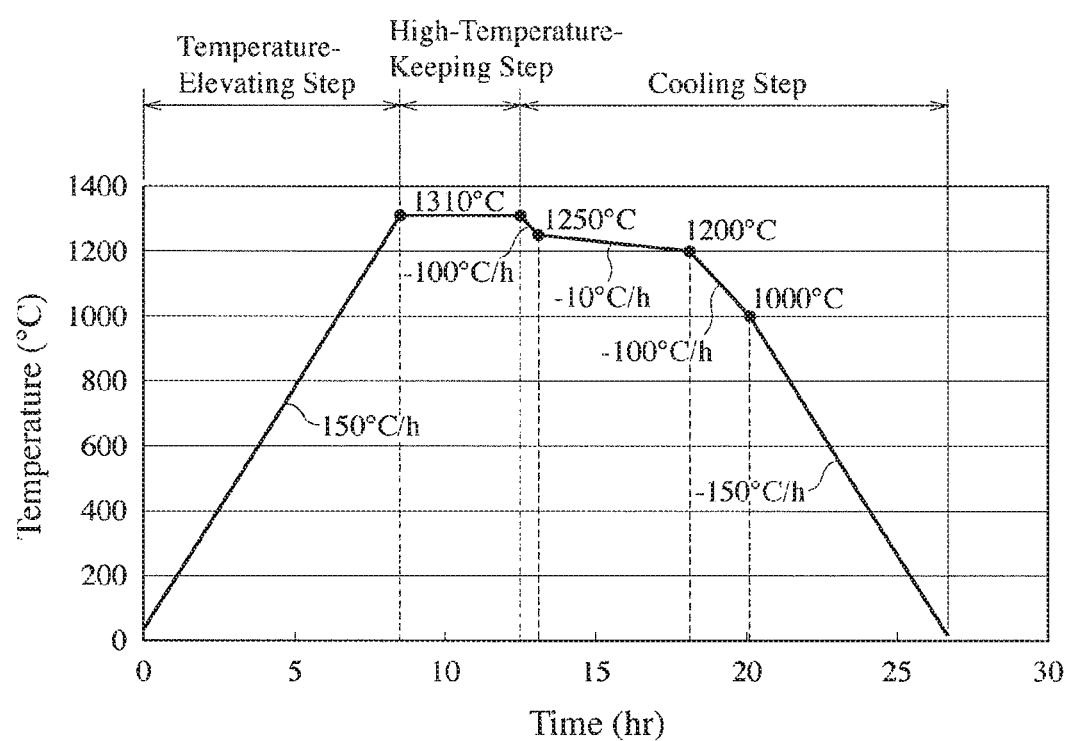

MNZN FERRITE AND ITS PRODUCTION METHOD

CROSS REFERENCE TO RELATED APPLICATIONS

This application is a National Stage of International Application No. PCT/JP2017/011931 filed Mar. 24, 2017, claiming priority based on Japanese Patent Application No. 2016-061925 filed Mar. 25, 2016, the disclosure of which is incorporated herein in its entirety by reference.

FIELD OF THE INVENTION

The present invention relates to a production method of MnZn ferrite used in electronic devices such as transformers, inductor, reactor, choke coils, etc. for various power supply devices.

BACKGROUND OF THE INVENTION

Electric vehicle, which is one of electric transportation equipments such as Electric Vehicle (EV) and Plug-in Hybrid Electric Vehicle (PHEV) which are rapidly spreading in recent years, is equipped with devices such as high power electric motors and chargers. The electronic component that can withstand high voltage and large current are used for them. The electronic component is composed of a coil and a magnetic core as a basic structure, and the magnetic core is made of a magnetic material such as MnZn ferrite.

In such applications, various mechanical and electrical load conditions are generated on the electronic component during running, and the environmental temperature to be used also varies. Normally, in anticipation of heat generation due to core loss, the temperature at which the core loss is minimized is adjusted by the crystal magnetic anisotropy constant K1 to a temperature slightly higher than the maximum environmental temperature to which the electronic component is exposed, thereby preventing ferrite from losing magnetism due to thermal runaway.

MnZn ferrite whose composition is designed so that the minimum temperature of core loss (also referred to as power loss) is 100° C. or less is used for electronic component used for home electronic appliances. However, for automotive applications, on the premise of use under a high-temperature environment, those having a minimum temperature of core loss Pcv at a high temperature exceeding 100° C. are often used. It is also required to have low core loss in a wide temperature range.

The core loss of the MnZn ferrite has temperature dependence, and has a minimum value at a temperature at which the crystal magnetic anisotropy constant K1 is 0 which the hysteresis loss is small. The temperature at which the crystal magnetic anisotropy constant K1 is 0 can be changed by appropriately adjusting the amount of metal ions having positive crystal magnetic anisotropy constants K1 and the amount of metal ions having negative crystal magnetic anisotropy constants K1 among metal ions constituting the spinel in the MnZn ferrite. The metal ions constituting the spinel include $Fe^{2+}$ and $Co^{2+}$ as metal ions having positive K1 and $Fe^{3+}$, $Mn^{2+}$, $Ni^{2+}$, etc. as metal ions having negative K1. The temperature at which the core loss is minimized can be relatively easily changed by adjusting the amount of metal ions such as $Fe^{2+}$, $Fe^{3+}$, $Zn^{2+}$ and $Mn^{2+}$, however, it is difficult to improve the temperature dependence of core loss only by adjusting the amount of these metal ions. Accordingly, $Co^{2+}$ having a sufficiently large crystal magnetic anisotropy constant than $Fe^{2+}$ is introduced so as to improve the temperature dependency of the core loss.

It is explained that such core loss Pcv of ferrite is generally composed of hysteresis loss Ph, eddy current loss Pe, and residual loss Pr. The hysteresis loss Ph increases in proportion to the frequency by direct current hysteresis and the eddy current loss Pe increases in proportion to the square of the frequency by the eddy current generated by the electromotive force generated by the electromagnetic induction action. The residual loss Pr which is the remaining loss caused by magnetic domain wall resonance, etc., becomes apparent at a frequency of 500 kHz or more. That is, the hysteresis loss Ph, the eddy current loss Pe, and the residual loss Pr vary with the frequency, and the ratio of them in the total core loss depends on the frequency band. Thus, MnZn ferrite is required to be suitable for the frequency and temperature to be used.

Reducing core loss of ferrite is addressed also by the manufacturing method. For example, Patent Document 1 (JP H03-268404 A) discloses a method for producing MnZn ferrite comprising the steps of calcining a raw material to be the MnZn ferrite, pulverizing, mixing with a binder added, granulating, molding, further sintering at 1250-1400° C., then holding at a temperature range of 1100° C. or more and less than 1250° C. for 20-360 minutes in an atmosphere with an oxygen concentration of 0.001-20%, and then cooling in a nitrogen atmosphere. This method brings the amount of cation defects to close 0 to reduce core loss by bringing $Fe^{2+}$ of MnZn ferrite closer to the concentration of $Fe^{2+}$ in spinel univocally determined by ferrite composition.

Patent Document 2 (JP H05-217734 A) discloses a method for producing MnZn ferrite with reduced core loss, by sintering a green body of MnZn ferrite containing Ca and Si at a temperature of 1200-1280° C., wherein an oxygen concentration in the atmosphere when a temperature is over 600° C. in a temperature-elevating step and of the initial 10-30 minutes in the sintering process, is set to 1% or less, and cooling at 50-250° C./h in a predetermined oxygen atmosphere after sintering.

Patent Document 3 (JP H07-297017 A) discloses a method for producing MnZn ferrite with reduced core loss in a high frequency band of 500 kHz-2 MHz, comprising the steps of molding a raw material containing Ca, Si and further containing at least one of Ti, Zr, Hf, Nb and Ta, sintering, followed by slow cooling and further cooling, wherein the sintering step and the slow cooling step are conducted in a predetermined oxygen atmosphere, and a cooling speed in the slow cooling is 50-150° C./h.

According to the producing methods mentioned in Patent Documents 1-3, it is possible to reduce core loss to a certain extent, however, further reduction of core loss and reducing core loss in a wide temperature range are required. The methods mentioned in Patent Documents 1-3 are not sufficient for these requests.

In addition, when the volume resistivity is small and the eddy current loss Pe is large, there is a problem that it is difficult to reduce core loss particularly in a high temperature range. In Patent Documents 1-3, Ca and Si, and further Ta, Nb, etc. introduced as sub-components are segregated at grain boundaries, thereby increasing the volume resistivity and reducing the core loss at 100° C. However, with the methods mentioned in Patent Documents 1-3, for example, it cannot be achieved sufficient low core loss in a high temperature environment at about 140° C., thus, further improvements are desired.

OBJECT OF THE INVENTION

Accordingly, an object of the present invention is to provide a method for producing MnZn ferrite and MnZn ferrite which can achieve low core loss at a wide temperature range.

SUMMARY OF THE INVENTION

As a result of intensive research in view of the above object, the present inventors have found that by cooling in a temperature range of 1100° C. to 1250° C. at a cooling speed of 0° C./hour to 20° C./hour for 1 hours to 20 hours in the cooling step of the sintered body in a process for producing MnZn ferrite by molding raw material powder and sintering, MnZn ferrite having a volume resistivity of 8.5 Ω·m or more at room temperature and having a low core loss at a wide temperature range can be obtained. The present invention has been completed based on such finding.

Thus, the method of the present invention for producing MnZn ferrite comprising Fe, Mn and Zn as main components, and Ca, Si and Co, and at least one selected from the group consisting of Ta, Nb and Zr as sub-components, comprises a step of molding a raw material powder for the MnZn ferrite to obtain a green body, and a step of sintering the green body;

the sintering step comprising a temperature-elevating step, a high-temperature-keeping step, and a cooling step;

the cooling step including a slow cooling step of cooling in a temperature range of 1100° C. to 1250° C. at a cooling speed of 0° C./hour to 20° C./hour for 1 hours to 20 hours, and a cooling speed before and after the slow cooling step being higher than 20° C./hour;

the MnZn ferrite having a volume resistivity of 8.5 Ω·m or more at room temperature, an average crystal grain size of 7 μm to 15 μm, and core loss of 420 kW/m$^3$ or less between 23° C. and 140° C. at a frequency of 100 kHz and an exciting magnetic flux density of 200 mT.

The high-temperature-keeping step is preferably conducted at a keeping temperature of higher than 1250° C. and 1350° C. or lower in an atmosphere having an oxygen concentration of more than 0.2% by volume and 10% by volume or less.

The concentration of oxygen in the cooling step is preferably controlled so that the relationship between the concentration of oxygen P[O$_2$](volume fraction) and a temperature T (° C.) satisfies a formula: $\log(P[O_2])=a-b/(T+273)$, wherein a and b are constants, a is 6.4 to 11.5 and b is 10000 to 18000.

The MnZn ferrite obtained by the above mentioned method comprises Fe, Mn and Zn as main components, and Si, Ca and Co, and at least one selected from the group consisting of Ta, Nb and Zr as sub-components, the main components comprising 53-54% by mol of Fe (calculated as Fe$_2$O$_3$), and 8.2-10.2% by mol of Zn (calculated as ZnO), the balance being Mn calculated as MnO, and the sub-components comprising more than 0.001 parts by mass and 0.015 parts by mass or less of Si (calculated as SiO$_2$), more than 0.1 parts by mass and 0.35 parts by mass or less of Ca (calculated as CaCO$_3$), 0.4 parts by mass or less (not including 0) of Co (calculated as Co$_3$O$_4$), 0.1 parts by mass or less (including 0) of Ta (calculated as Ta$_2$O$_5$), 0.1 parts by mass or less (including 0) of Zr (calculated as ZrO$_2$), and 0.05 parts by mass or less (including 0) of Nb (calculated as Nb$_2$O$_5$), the total amount of Ta$_2$O$_5$, ZrO$_2$ and Nb$_2$O$_5$ being 0.1 parts by mass or less (not including 0), per 100 parts by mass in total of the main components (calculated as the oxides).

The MnZn ferrite of the present invention comprises 53-54% by mol of Fe (calculated as Fe$_2$O$_3$), and 8.2-10.2% by mol of Zn (calculated as ZnO), the balance being Mn (calculated as MnO), as main components, and more than 0.001 parts by mass and 0.015 parts by mass or less of Si (calculated as SiO$_2$), more than 0.1 parts by mass and 0.35 parts by mass or less of Ca (calculated as CaCO$_3$), 0.4 parts by mass or less (not including 0) of Co (calculated as Co$_3$O$_4$), 0.1 parts by mass or less (including 0) of Ta (calculated as Ta$_2$O$_5$), 0.1 parts by mass or less (including 0) of Zr (calculated as ZrO$_2$), and 0.05 parts by mass or less (including 0) of Nb (calculated as Nb$_2$O$_5$), the total amount of Ta$_2$O$_5$, ZrO$_2$ and Nb$_2$O$_5$ being 0.1 parts by mass or less (not including 0), as sub-components, per 100 parts by mass in total of the main components (calculated as the oxides), the MnZn ferrite having a volume resistivity of 8.5 Ω·m or more at room temperature, an average crystal grain size of 7 μm to 15 μm, core loss of 420 kW/m$^3$ or less between 23° C. and 140° C. at a frequency of 100 kHz and an exciting magnetic flux density of 200 mT, and initial permeability μi of 2800 or more at a frequency of 100 kHz and at 20° C.

The MnZn ferrite of the present invention comprises the sub-components comprising more than 0.003 parts by mass and 0.012 parts by mass or less of Si (calculated as SiO$_2$), more than 0.1 parts by mass and 0.35 parts by mass or less of Ca (calculated as CaCO$_3$), and 0.2 parts by mass or more and 0.4 parts by mass or less of Co (calculated as Co$_3$O$_4$), and said sub-components further comprises at least one selected from the group consisting of 0.015 parts by mass or more and 0.1 parts by mass or less of Ta (calculated as Ta$_2$O$_5$), 0.03 parts by mass or more and 0.1 parts by mass or less of Zr (calculated as ZrO$_2$), and 0.02 parts by mass or more and 0.05 parts by mass or less of Nb (calculated as Nb$_2$O$_5$), the total amount of Ta$_2$O$_5$, ZrO$_2$ and Nb$_2$O$_5$ being 0.1 parts by mass or less (not including 0), per 100 parts by mass in total of the main components (calculated as the oxides), the MnZn ferrite having core loss of 400 kW/m$^3$ or less at a frequency of 100 kHz and an exciting magnetic flux density of 200 mT and at 23° C.

Effects of the Invention

According to the present invention, it is possible to provide a method for producing MnZn ferrite having a low core loss in a wide temperature range and the MnZn ferrite.

BRIEF DESCRIPTION OF DRAWINGS

FIG. 1 is a graph showing temperature conditions in a sintering step according to an embodiment of the present invention.

DESCRIPTION OF THE PREFERRED EMBODIMENTS

A production method of MnZn ferrite and the MnZn ferrite obtained by the method according to an embodiment of the present invention will be specifically explained below. It should be noted, however, that the present invention is not restricted thereto, but modifications may be made properly within the scope of the technical idea. The numerical range expressed by "-" in this specification means a range including the numbers described before and after "-" as the upper and lower limits.

A method for producing MnZn ferrite of the present invention comprises a step of molding a raw material powder for the MnZn ferrite to obtain a green body, and a step of sintering the green body, the raw material powder containing Fe, Mn and Zn as main components, and Ca, Si and Co, and at least one selected from the group consisting of Ta, Nb and Zr as sub-components. Si, Ca, Ta, Zr and Nb are present in grain boundaries of MnZn ferrite and insulate crystal grains by increasing resistance of grain boundary layers, thereby reducing relative loss coefficient tan δ/μi and thus reducing core loss. Each of Ta, Zr and Nb may be contained individually or in plural.

Although Si exclusively segregates in grain boundaries and triple points, Ca, Ta, Zr and Nb are dissolved in spinel phase in the course of the sintering step, and may be partly dissolved after sintering and remain in the crystal grains in some cases. When the content of Ca, Ta, Zr and Nb dissolved in the spinel phase increases, resistance in the crystal grain is increased and a volume resistivity ρ can be increased. However, the content of Ca, Ta, Zr and Nb in the grain boundaries relatively decreases. To obtain MnZn ferrite having low core loss by achieving a high volume resistivity, it is effective to increase the resistance in crystal grains and to form high-resistance grain boundaries by appropriately adjusting the content of Ca, Ta, Zr and Nb dissolved in spinel phase and segregated in crystal grain boundaries. Such adjustment can be carried out by controlling sintering temperature and sintering atmosphere as described later.

By adding $Co^{2+}$ in addition to $Fe^{2+}$, temperature change of the core loss decreases, and low core loss over a wide temperature range can be obtained. In addition, since residual magnetic flux density Br can be reduced by adding $Co^{2+}$, it is possible to reduce the hysteresis loss Ph to obtain MnZn ferrite having low core loss.

The sintering step comprises a temperature-elevating step, a high-temperature-keeping step, and a cooling step. The cooling step has a slow cooling step of cooling in a temperature range of 1100° C.-1250° C. at a cooling speed of 0-20° C./hour for 1-20 hours, and a cooling speed before and after the slow cooling step is made to be higher than 20° C./hour. In the present invention, it is preferable to reduce the core loss by segregating Ca, Ta, Zr and Nb at grain boundaries and properly controlling them dissolving in crystal grains.

To increase a resistance of crystal grain boundaries, a slow cooling step of cooling in a temperature range of 1100° C. to 1250° C. at a cooling speed of 0° C./hour to 20° C./hour for 1 hours to 20 hours, is provided in the cooling step. When the slow cooling step is provided in a temperature range exceeding 1250° C., the core loss between 23° C. and 140° C. increases due to an influence of internal distortion increase caused by volatilization of zinc from the surface layer. When the slow cooling step is provided in a temperature range of less than 1100° C., the core loss on a low temperature side increases due to excessive grain boundary segregation of Ca etc., thereby it is difficult to obtain a desired core loss.

When the cooling speed is more than 20° C./hour, segregation of Ca etc. to the grain boundaries is not sufficient and a high volume resistivity cannot be obtained, thereby the core loss on the high temperature side increases and thus it is difficult to obtain a desired core loss. It is noted that the cooling speed of 0° C./hour means to hold at a constant temperature. When the slow cooling step is conducted for less than 1 hour, the effect of reducing core loss cannot be sufficiently obtained. When it exceeds 20 hours, the crystal growth proceeds and the particle diameter increases, thereby volume resistivity decreases, and thus core loss may increase in some cases. Further, a cooling speed before and after the slow cooling step is set to be higher than the cooling speed in the slow cooling step, namely, more than 20° C./hour. When the cooling speed before the slow cooling step is 20° C./hour or less, the amount of volatilization of zinc from the surface layer increases, thereby an internal strain increases and thus core loss increases. When the cooling speed after the slow cooling step is 20° C./hour or less, Ca etc. are excessively segregated at grain boundaries and core loss increases. It is preferable to set a cooling speed to 50-150° C./hour from the high-temperature-keeping step to the slow cooling step and the cooling step after the slow cooling step, namely, before and after the slow cooling step. Through such processes, volume resistivity at room temperature can be 8.5 Ω·m or more. Further, the volume resistivity is preferably 10 Ω·m or more so as to reduce the eddy current loss Pe.

In the slow cooling step, when an oxygen concentration is high, a sintered body is oxidized, resulting in precipitation of hematite from spinel, whereas when an oxygen concentration is low, wustite precipitates and crystal strain is generated, resulting in undesirable increase of core loss. Therefore, it is preferable to control an oxygen concentration so that precipitation of hematite and precipitation of wustite do not occur. It is further preferable to control an oxygen concentration in the cooling step so that the relationship between an oxygen concentration P [$O_2$] (volume fraction) and a temperature T (° C.) satisfies a formula:

$$\log(P\ [O_2])=a-b/(T+273),$$

wherein a and b are constants, a is preferably 3.1-12.8 and b is preferably 6000-20000. a is defined from a temperature and an oxygen concentration in the high-temperature-keeping step. When b is smaller than the above range, even if a temperature is lowered, an oxygen concentration is high and oxidation proceeds, which may result in precipitation of hematite from spinel in some cases. When b is large, an oxygen concentration decreases and wustite precipitates and so on, thereby both crystal grains and grain boundary layers are not oxidized sufficiently, resulting in low resistance. More preferably, a is 6.4-11.5 and b is 10000-18000.

In the temperature-elevating step, it is carried out in the air between room temperature and a temperature of 750° C. or more and 950° C. or less (first temperature-elevating step) so as to remove a binder from the green body. It is preferable to reduce an oxygen concentration in the atmosphere to 0.1-2% by volume in a second temperature-elevating step, that is, from the first temperature-elevating step to the high-temperature-keeping step. The temperature-elevating speed in the temperature-elevating step may be appropriately selected depending on the state of residual carbon in binder removal and its composition. The average temperature-elevating speed is preferably in a range of 50-200° C./hour.

The temperature in the high-temperature-keeping step is higher than 1250° C. and 1350° C. or less, and an oxygen concentration in the atmosphere is higher than 0.2% by volume and 10% by volume or less, and is preferably set higher than the oxygen concentration adjusted in the second temperature-elevating step.

In the present invention, MnZn ferrite comprises Fe, Mn and Zn as main components, and Ca, Si and Co, and at least one selected from the group consisting of Ta, Nb and Zr as sub-components. The main components mainly are elements or compounds constituting spinel ferrite, whereas the sub-components are elements or compounds which are supplementarily used for its formation, and include the elements, a part of which dissolves in the spinel ferrite. Those constituting the spinel ferrite such as Co are also contained as sub-components because their content is smaller than those of the main components.

It is preferable that the main components comprises 53-54% by mol of Fe (calculated as $Fe_2O_3$), and 8.2-10.2% by mol of Zn (calculated as ZnO), the balance being Mn calculated as MnO, and the sub-components comprises more than 0.001 parts by mass and 0.015 parts by mass or less of Si (calculated as $SiO_2$), more than 0.1 parts by mass and 0.35 parts by mass or less of Ca (calculated as $CaCO_3$), 0.4 parts by mass or less (not including 0) of Co (calculated as $Co_3O_4$), 0.1 parts by mass or less (including 0) of Ta (calculated as $Ta_2O_5$), 0.1 parts by mass or less (including 0) of Zr (calculated as $ZrO_2$), and 0.05 parts by mass or less (including 0) of Nb (calculated as $Nb_2O_5$), the total amount of $Ta_2O_5$, $ZrO_2$ and $Nb_2O_5$ being 0.1 parts by mass or less (not including 0), per 100 parts by mass in total of the main components (calculated as the oxides).

In the MnZn ferrite of the present invention, when the contents of Si and Ca are in the above-mentioned range, Si and Ca are present in the grain boundaries to insulate crystal grains, thereby volume resistivity ρ is increased, and thus relative loss coefficient tan δ/μi can be reduced. The contents of Si and Ca are preferably more than 0.001 parts by mass and 0.015 parts by mass or less calculated as $SiO_2$, and more than 0.1 parts by mass and 0.035 parts by mass or less calculated as $CaCO_3$, respectively, per 100 parts by mass in total of the main components (calculated as the oxides). It is more preferably 0.003 parts by mass or more and 0.012 parts by mass or less calculated as $SiO_2$ and more than 0.1 parts by mass and 0.25 parts by mass or less calculated as $CaCO_3$.

By adding $Co^{2+}$, temperature change of the core loss decreases, and low core loss over a wide temperature range can be obtained, also since residual magnetic flux density Br is reduced, it is possible to reduce hysteresis loss Ph. However, when the content of Co is too large, a magnetization curve tends to be a Perminber type, and a crystal magnetic anisotropy constant on the low temperature side is too large on the positive side, and may degrade on the contrary in some cases. The content of Co is preferably 0.4 parts by mass or less (not including 0) calculated as $Co_3O_4$, more preferably 0.2 parts by mass or more and 0.4 parts by mass or less calculated as $Co_3O_4$, and most preferably 0.25 parts by mass or more and 0.35 parts by mass or less calculated as $Co_3O_4$, per 100 parts by mass in total of the main components (calculated as the oxides).

Ta, Zr and Nb appear in the grain boundary layers together with Si and Ca, contribute to reducing core loss by increasing the resistance of the grain boundary layers. Ta, Zr and Nb may be contained individually or in combination of two or more. When contained alone, the contents of Ta, Zr and Nb are preferably 0.1 parts by mass or less (including 0) calculated as $Ta_2O_5$, 0.1 parts by mass or less (including 0) calculated as $ZrO_2$, and 0.05 parts by mass or less (including 0) calculated as $Nb_2O_5$, respectively, per 100 parts by mass in total of the main components (calculated as the oxides). When two or more of Ta, Zr and Nb are contained, the total amount calculated as $Ta_2O_5$, $ZrO_2$ and $Nb_2O_5$ is preferably 0.1 parts by mass or less (not including 0). When Ta, Zr and Nb are contained alone, the lower limit of the contents of Ta, Zr and Nb are preferably 0.03 parts by mass calculated as $Ta_2O_5$, $ZrO_2$ and $Nb_2O_5$, respectively. When two or more of Ta, Zr and Nb are contained, the total amount calculated as $Ta_2O_5$, $ZrO_2$ and $Nb_2O_5$ is preferably 0.03 parts by mass or more.

Sulfur S, chlorine Cl, phosphorus P, boron B, etc. may be contained as impurities in raw materials constituting MnZn ferrite. In the present invention, these impurities are not specifically defined, however, it is empirically known that reduction in core loss and improvement in magnetic permeability can be obtained by decreasing these impurities. Particularly, with respect to S, a compound with Ca may be generated and segregated as foreign matter at the grain boundaries, thereby decreasing the volume resistivity ρ and increasing the eddy current loss in some cases. Therefore, for further reduction of the core loss, it is preferable to reduce impurities and to be 0.03 parts by mass or less of S, 0.01 parts by mass or less of Cl, 0.001 parts by mass or less of P, and 0.0001 parts by mass or less of B, per 100 parts by mass in total of the main components (calculated as the oxides).

Although a preferable average crystal grain size of the MnZn ferrite varies depending on a frequency to be used, when a frequency is less than 500 kHz, it is preferable to reduce coercive force He and reduce hysteresis loss by over 5 μm. It is more preferably 7 μm or more and 15 μm or less.

The present invention will be explained in further detail by Examples below, without intention of restriction.

EXAMPLE 1

As shown in Table 1, 53.4 mol % of $Fe_2O_3$, 9.2 mol % of ZnO, and 37.4 mol % of $Mn_3O_4$ calculated as MnO as a main component were wet-mixed and dried, and calcined at 900° C. for 3 hours. 100 parts by mass of the calcined powder was then mixed with $SiO_2$, $CaCO_3$, $Co_3O_4$, $Ta_2O_5$, $ZrO_2$ and $Nb_2O_5$ to provide the MnZn ferrite compositions shown in Table 1, and pulverized to an average pulverized particle size of 1.2-1.4 μm in a ball mill. With polyvinyl alcohol added as a binder, the resulting mixture was granulated by a mortar, and compression-molded to a ring-shaped green body, which was sintered to obtain a magnetic core (sintered ferrite body) having an outer diameter of 25 mm, an inner diameter of 15 mm and a thickness of 5 mm.

TABLE 1

| Sample No.[1] | Main components (mol %) | | | Sub-components (parts by mass [3]) | | | | | |
|---|---|---|---|---|---|---|---|---|---|
| | $Fe_2O_3$ | ZnO | MnO[2] | $Co_3O_4$ | $SiO_2$ | $CaCO_3$ | $Ta_2O_5$ | $ZrO_2$ | $Nb_2O_5$ |
| 1 | 53.4 | 9.2 | 37.4 | 0.3 | 0.003 | 0.18 | 0.05 | 0 | 0 |
| 2 | 53.4 | 9.2 | 37.4 | 0.3 | 0.006 | 0.18 | 0.05 | 0 | 0 |
| 3 | 53.4 | 9.2 | 37.4 | 0.3 | 0.015 | 0.18 | 0.05 | 0 | 0 |
| *4 | 53.4 | 9.2 | 37.4 | 0.3 | 0.02 | 0.18 | 0.05 | 0 | 0 |
| *5 | 53.4 | 9.2 | 37.4 | 0.3 | 0.006 | 0.07 | 0.05 | 0 | 0 |

TABLE 1-continued

| Sample No.[1] | Main components (mol %) | | | Sub-components (parts by mass [3]) | | | | | |
|---|---|---|---|---|---|---|---|---|---|
| | Fe$_2$O$_3$ | ZnO | MnO[2] | Co$_3$O$_4$ | SiO$_2$ | CaCO$_3$ | Ta$_2$O$_5$ | ZrO$_2$ | Nb$_2$O$_5$ |
| 6 | 53.4 | 9.2 | 37.4 | 0.3 | 0.006 | 0.1 | 0.05 | 0 | 0 |
| 7 | 53.4 | 9.2 | 37.4 | 0.3 | 0.006 | 0.35 | 0.05 | 0 | 0 |
| *8 | 53.4 | 9.2 | 37.4 | 0.3 | 0.006 | 0.4 | 0.05 | 0 | 0 |
| *9 | 53.4 | 9.2 | 37.4 | 0.3 | 0.006 | 0.18 | 0 | 0 | 0 |
| 10 | 53.4 | 9.2 | 37.4 | 0.3 | 0.006 | 0.18 | 0.015 | 0 | 0 |
| 11 | 53.4 | 9.2 | 37.4 | 0.3 | 0.006 | 0.18 | 0.03 | 0 | 0 |
| 12 | 53.4 | 9.2 | 37.4 | 0.3 | 0.006 | 0.18 | 0.1 | 0 | 0 |
| *13 | 53.4 | 9.2 | 37.4 | 0.3 | 0.006 | 0.18 | 0.13 | 0 | 0 |
| 14 | 53.4 | 9.2 | 37.4 | 0.3 | 0.006 | 0.18 | 0 | 0.03 | 0 |
| 15 | 53.4 | 9.2 | 37.4 | 0.3 | 0.006 | 0.18 | 0 | 0.1 | 0 |
| *16 | 53.4 | 9.2 | 37.4 | 0.3 | 0.006 | 0.18 | 0 | 0.15 | 0 |
| 17 | 53.4 | 9.2 | 37.4 | 0.3 | 0.006 | 0.18 | 0 | 0 | 0.02 |
| 18 | 53.4 | 9.2 | 37.4 | 0.3 | 0.006 | 0.18 | 0 | 0 | 0.05 |
| *19 | 53.4 | 9.2 | 37.4 | 0.3 | 0.006 | 0.18 | 0 | 0 | 0.07 |
| 20 | 53.4 | 9.2 | 37.4 | 0.3 | 0.006 | 0.18 | 0.03 | 0.07 | 0 |
| 21 | 53.4 | 9.2 | 37.4 | 0.3 | 0.006 | 0.18 | 0.03 | 0 | 0.02 |
| 22 | 53.4 | 9.2 | 37.4 | 0.3 | 0.006 | 0.18 | 0.03 | 0.03 | 0.02 |
| *23 | 53.4 | 9.2 | 37.4 | 0 | 0.003 | 0.18 | 0.05 | 0 | 0 |
| 24 | 53.4 | 9.2 | 37.4 | 0.16 | 0.003 | 0.18 | 0.05 | 0 | 0 |
| 25 | 53.4 | 9.2 | 37.4 | 0.4 | 0.003 | 0.18 | 0.05 | 0 | 0 |
| *26 | 53.4 | 9.2 | 37.4 | 0.5 | 0.003 | 0.18 | 0.05 | 0 | 0 |

Note:
[1] Sample No. with "*" indicates a Comparative Example.
Note:
[2] Mn$_3$O$_4$ was used as a raw material, and the composition was shown as MnO.
Note:
[3] The amount per 100 parts by mass of calcined powder consisting of the main component.

FIG. 1 shows the temperature conditions in the sintering step. Sintering comprises a temperature-elevating step of elevating the temperature from room temperature to 1310° C., a high-temperature-keeping step of keeping at 1310° C. for 4 hours, and a cooling step of cooling a temperature from 1310° C. to room temperature. The temperature-elevating step was carried out at a temperature-elevating speed of 150° C./hour in the air (in an atmosphere having an oxygen concentration of 21% by volume) in a temperature range from room temperature to 800° C., and in an atmosphere having an oxygen concentration of 1% by volume in a temperature range over 800° C. In the high-temperature-keeping step, the oxygen concentration was kept at 1% by volume. The cooling step was carried out at cooling speed of 100° C./hour in a temperature range from 1310° C. (high-temperature-keeping temperature) to 1250° C., at cooling speed of 10° C./hour in a temperature range from 1250° C. to 1200° C., at cooling speed of 100° C./hour in a temperature range from 1200° C. to 1000° C., and at cooling speed of 150° C./hour in a temperature range under 1000° C. The oxygen concentration (volume fraction) in the cooling step down to 1000° C. was shifted according to the formula: log(P [O$_2$])=a−b/(T+273), where a=6.9 and b=14000. Specifically, the oxygen concentration was controlled so as to be 0.5% by volume at 1250° C., 0.25% by volume at 1200° C., and 0.01% by volume (100 ppm) at 1000° C. Cooling was conducted in N$_2$ flow lower than 1000° C., and the final oxygen concentration decreased to about 0.003% by volume (30 ppm).

With respect to the obtained magnetic core, core loss Pcv, initial permeability μi, volume resistivity ρ, and average crystal grain size were evaluated. The evaluation methods are as follows.

Core Loss Pcv

Using a B-H analyzer (SY-8232 available from Iwatsu Electric Co., Ltd.), the core loss Pcv of a magnetic core having a five-turn primary winding and a five-turn secondary winding was measured between 23° C. and 140° C. at a frequency of 100 kHz and an exciting magnetic flux density of 200 mT.

Initial Permeability μi

The initial permeability μi of a 10-turn magnetic core was measured at 23° C. and 100 kHz in a magnetic field of 0.4 A/m by HP-4284A available from Hewlett-Packard.

Volume Resistivity ρ

A flat plate sample cut out from the magnetic core was coated with a gallium indium alloy as an electrode on the two opposing planes, and the electric resistance R (Ω) was measured using 3224 available from Hioki Electric Corporation. From the area A (m$^2$) of the plane on which the electrode was formed and the thickness t (m), the volume resistivity ρ (Ω·m) was calculated by the following formula:

$$\text{Volume resistivity } \rho \text{ } (\Omega \cdot m) = R \times (A/t).$$

Average Crystal Grain Size

The average crystal grain size was calculated by a quadrature method in a square region of 100 μm×100 μm in a photograph (400 times) taken by an optical microscope on a mirror-polished sintered ferrite body thermally etched at 1100° C. for 1 hour in N$_2$.

The results of the initial permeability μi, the volume resistivity ρ, the average crystal grain size and the core loss Pcv are shown in Table 2.

TABLE 2

| Sample No.[1] | Volume Resistivity ρ (Ω·m) | Average Crystal Grain Size (μm) | Initial Permeability (μi) | Core Loss Pcv (kW/m$^3$) | | |
|---|---|---|---|---|---|---|
| | | | | 23° C. | 100° C. | 140° C. |
| 1 | 11.9 | 10.7 | 3500 | 379 | 279 | 367 |
| 2 | 18.3 | 9.5 | 3410 | 297 | 273 | 377 |
| 3 | 19.6 | 9.0 | 3090 | 415 | 309 | 385 |

TABLE 2-continued

| Sample No.[1] | Volume Resistivity ρ (Ω·m) | Average Crystal Grain Size (μm) | Initial Permeability (μi) | Core Loss Pcv (kW/m³) 23° C. | 100° C. | 140° C. |
|---|---|---|---|---|---|---|
| *4 | 1.2 | 8.9 | 2820 | 663 | 448 | 566 |
| *5 | 6.2 | 10.8 | 3730 | 397 | 294 | 483 |
| 6 | 12.0 | 10.3 | 3470 | 338 | 282 | 383 |
| 7 | 16.5 | 9.6 | 3200 | 370 | 303 | 377 |
| *8 | 0.2 | 7.2 | 2240 | 949 | 717 | 700 |
| *9 | 5.3 | 8.9 | 3660 | 400 | 308 | 503 |
| 10 | 10.0 | 10.3 | 3690 | 342 | 281 | 388 |
| 11 | 14.1 | 11.5 | 3660 | 315 | 262 | 371 |
| 12 | 17.0 | 10.2 | 3230 | 347 | 280 | 357 |
| *13 | 5.6 | 11.4 | 3200 | 431 | 354 | 502 |
| 14 | 10.3 | 9.1 | 3720 | 351 | 292 | 383 |
| 15 | 11.4 | 10.4 | 3720 | 355 | 278 | 359 |
| *16 | 6.1 | 10.1 | 3110 | 520 | 420 | 535 |
| 17 | 14.3 | 10.2 | 3630 | 343 | 293 | 408 |
| 18 | 13.1 | 9.3 | 3340 | 335 | 291 | 395 |
| *19 | 0.1 | 11.3 | 3110 | 618 | 650 | 850 |
| 20 | 16.3 | 10.4 | 3100 | 379 | 277 | 373 |
| 21 | 13.7 | 9.1 | 3360 | 359 | 305 | 394 |
| 22 | 17.5 | 10.6 | 3020 | 385 | 280 | 379 |
| *23 | 14.8 | 9.5 | 2340 | 532 | 308 | 335 |
| 24 | 11.9 | 10.5 | 2950 | 409 | 295 | 346 |
| 25 | 11.2 | 11.3 | 3150 | 352 | 279 | 367 |
| *26 | 5.0 | 11.5 | 2860 | 446 | 279 | 490 |

Note:
[1]Sample No. with "*" indicates a Comparative Example.

From Table 2, it is understood that the MnZn ferrites of Examples of the present invention have high volume resistivity of 8.5 Ω·m or more, and have core losses of 420 kW/m³ or less even under a high temperature environment at 140° C. On the other hand, it is understood that the MnZn ferrites of Comparative Examples excluding Sample No. *23 have volume resistivity of less than 8.5 Ω·m, and have high magnetic core losses. The MnZn ferrite of Sample No. *23 not containing Co had core loss of more than 420 kW/m³ at 23° C. Some Comparative Examples had core losses of 420 kW/m³ or less at 23° C. and 100° C., however, under a high temperature environment at 140° C. core losses of these Comparative Examples were more than 420 kW/m³. As described above, by having a composition comprising Ca, Si and Co, and at least one selected from the group consisting of Ta, Nb and Zr as sub-components, and providing a slow cooling step under predetermined conditions in a cooling step of sintering, MnZn ferrite having low core loss from low temperature (23° C.) to high temperature (140° C.) could be obtained.

EXAMPLE 2

MnZn ferrites were produced in the same manner as in Sample 1, except that the compositions of the main components were changed as shown in Table 3. The results of the initial permeability μi, the volume resistivity ρ, the average crystal grain size, and the core loss Pcv were shown in Table 4. Every MnZn ferrites exhibited high volume resistivity of 10 Ω·m or more, however, the MnZn ferrites of Comparative Examples exhibited core losses of higher than 420 kW/m³ at high temperature or low temperature. On the other hand, the all MnZn ferrites of Examples exhibited core losses of 420 kW/m³ or less.

TABLE 3

| Sample No.[1] | Main Components (mol %) | | | Sub-Components (parts by mass [3]) | | | | | |
|---|---|---|---|---|---|---|---|---|---|
| | $Fe_2O_3$ | ZnO | $MnO^{[2]}$ | $Co_3O_4$ | $SiO_2$ | $CaCO_3$ | $Ta_2O_5$ | $ZrO_2$ | $Nb_2O_5$ |
| 27 | 53.0 | 10.2 | 36.8 | 0.3 | 0.003 | 0.18 | 0.05 | 0 | 0 |
| 28 | 53.4 | 9.2 | 37.4 | 0.3 | 0.003 | 0.18 | 0.05 | 0 | 0 |
| 29 | 54.0 | 8.2 | 37.8 | 0.3 | 0.003 | 0.18 | 0.05 | 0 | 0 |
| *30 | 54.5 | 8.5 | 37.0 | 0.3 | 0.003 | 0.18 | 0.05 | 0 | 0 |
| *31 | 53.0 | 7.5 | 39.5 | 0.3 | 0.003 | 0.18 | 0.05 | 0 | 0 |
| *32 | 52.5 | 8.5 | 39.0 | 0.3 | 0.003 | 0.18 | 0.05 | 0 | 0 |
| *33 | 54.0 | 11.0 | 35.0 | 0.3 | 0.003 | 0.18 | 0.05 | 0 | 0 |

Note:
[1]Sample No. with "*" indicates a Comparative Example.
Note:
[2]$Mn_3O_4$ was used as a raw material, and the composition was shown as MnO.
Note:
[3] The amount per 100 parts by mass of calcined powder consisting of the main component.

TABLE 4

| Sample No.[1] | Volume Resistivity ρ (Ω·m) | Average Crystal Grain Size (μm) | Initial Permeability (μi) | Core Loss Pcv (kW/m³) 23° C. | 100° C. | 140° C. |
|---|---|---|---|---|---|---|
| 27 | 13.0 | 11.0 | 3560 | 390 | 295 | 350 |
| 28 | 11.9 | 10.7 | 3500 | 379 | 279 | 367 |
| 29 | 10.9 | 10.0 | 3560 | 349 | 256 | 411 |
| *30 | 10.1 | 10.2 | 3700 | 321 | 287 | 452 |
| *31 | 12.8 | 10.2 | 2760 | 503 | 352 | 382 |
| *32 | 10.3 | 9.7 | 2600 | 543 | 405 | 423 |
| *33 | 13.5 | 11.5 | 3650 | 332 | 309 | 456 |

Note:
[1]Sample No. with "*" indicates a Comparative Example.

EXAMPLE 3

MnZn ferrites were produced in the same manner as in Sample 1, except that the compositions were changed as shown in Table 5 and the temperatures in the high-temperature-keeping step were changed as shown in Table 6. The results of the initial permeability μi, the volume resistivity ρ, the average crystal grain size, and the core loss Pcv were shown in Table 6. Every MnZn ferrites exhibited high volume resistivity of 8.5 Ω·m or more, however, the MnZn ferrites of Sample No. *40 (Comparative Example) having the average crystal grain size of less than 7 μm exhibited core losses of higher than 420 kW/m³ at 140° C. On the other hand, the all MnZn ferrites of Examples exhibited core losses of 420 kW/m³ or less.

TABLE 5

| Main Components (mol %) | | | Sub-Components (parts by mass [2]) | | | | | |
| --- | --- | --- | --- | --- | --- | --- | --- | --- |
| Fe$_2$O$_3$ | ZnO | MnO[1] | Co$_3$O$_4$ | SiO$_2$ | CaCO$_3$ | Ta$_2$O$_5$ | ZrO$_2$ | Nb$_2$O$_5$ |
| 53.4 | 9.2 | 37.4 | 0.3 | 0.009 | 0.18 | 0.04 | 0 | 0 |

Note:
[1] Mn$_3$O$_4$ was used as a raw material, and the composition was shown as MnO.

Note:
[2] The amount, per 100 parts by mass of calcined powder consisting of the main component.

TABLE 6

| Sample No.[1] | Temperature kept at High-Temperature (° C.) | Volume Resistivity ρ (Ω·m) | Average Crystal Grain Size (μm) | Initial Permeability (μi) | Core Loss Pcv (kW/m³) | | |
| --- | --- | --- | --- | --- | --- | --- | --- |
| | | | | | 23° C. | 100° C. | 140° C. |
| 34 | 1335 | 12.2 | 13 | 3020 | 388 | 268 | 336 |
| 35 | 1310 | 14.9 | 10.2 | 2970 | 371 | 265 | 325 |
| 36 | 1295 | 16.8 | 9.3 | 2900 | 349 | 262 | 332 |
| 37 | 1280 | 18.1 | 8.4 | 2870 | 345 | 267 | 337 |
| 38 | 1265 | 18.7 | 7.4 | 2830 | 340 | 260 | 345 |
| 39 | 1250 | 18.9 | 7.0 | 2780 | 340 | 277 | 382 |
| *40 | 1235 | 19.5 | 6.3 | 2690 | 334 | 291 | 423 |

Note:
[1] Sample No. with "*" indicates a Comparative Example.

EXAMPLE 4

MnZn ferrites were produced in the same manner as in Sample 1, except that the compositions were changed as shown in Table 5 and the ranges of the slow cooling step were changed as shown in Table 7. The results of the initial permeability μi, the volume resistivity ρ, and the core loss Pcv were shown in Table 7. By setting the slow cooling temperature within the range specified by the method of the present invention, MnZn ferrite having core losses of 420 kW/m³ or less from low temperature (23° C.) to high temperature (140° C.) could be obtained.

TABLE 7

| Sample No.[1] | Temperature Range of Slow Cooling (° C.) | Volume Resistivity ρ (Ω·m) | Initial Permeability (μi) | Core Loss Pcv (kW/m³) | | |
| --- | --- | --- | --- | --- | --- | --- |
| | | | | 23° C. | 100° C. | 140° C. |
| *41 | — | 8.2 | 3140 | 360 | 326 | 450 |
| *42 | 1300-1250 | 12.6 | 2760 | 462 | 385 | 430 |
| 43 | 1250-1200 | 14.9 | 2970 | 371 | 265 | 325 |
| 44 | 1200-1150 | 18.5 | 2960 | 385 | 275 | 320 |
| 45 | 1150-1100 | 20.3 | 2850 | 395 | 298 | 345 |
| *46 | 1100-1050 | 22.3 | 2610 | 430 | 320 | 350 |
| *47 | 1050-1000 | 22.5 | 2320 | 460 | 340 | 370 |

TABLE 7-continued

| Sample No.[1] | Temperature Range of Slow Cooling (° C.) | Volume Resistivity ρ (Ω·m) | Initial Permeability (μi) | Core Loss Pcv (kW/m³) | | |
| --- | --- | --- | --- | --- | --- | --- |
| | | | | 23° C. | 100° C. | 140° C. |
| *48 | 1300-1200 | 14.2 | 2720 | 442 | 378 | 425 |
| *49 | 1150-1050 | 22.5 | 2530 | 445 | 338 | 370 |

Note:
[1] Sample No. with "*" indicates a Comparative Example.

EXAMPLE 5

MnZn ferrites were produced in the same manner as in Sample 1, except that the compositions of the main components were changed as shown in Table 5 and the cooling speed in the slow cooling step were changed as shown in Table 8. The results of the initial permeability μi, the volume resistivity ρ, and the core loss Pcv were shown in Table 8. By setting the cooling speed within the range specified by the method of the present invention, MnZn ferrite having core losses of 420 kW/m³ or less from low temperature (23° C.) to high temperature (140° C.) could be obtained.

TABLE 8

| Sample No.[1] | Cooling Speed in Slow Cooling Step (° C./hours) | Volume Resistivity ρ (Ω·m) | Initial Permeability (μi) | Core Loss Pcv (kW/m³) | | |
| --- | --- | --- | --- | --- | --- | --- |
| | | | | 23° C. | 100° C. | 140° C. |
| *50 | 100 | 8.2 | 3140 | 360 | 326 | 450 |
| *51 | 50 | 10.0 | 3110 | 366 | 317 | 431 |
| 52 | 20 | 13.5 | 3050 | 370 | 276 | 340 |
| 53 | 10 | 14.9 | 2970 | 371 | 265 | 325 |
| 54 | 5 | 16.3 | 2930 | 384 | 276 | 310 |
| 55 | 3 | 19.8 | 2850 | 395 | 275 | 315 |

Note:
[1] Sample No. with "*" indicates a Comparative Example.

As described above, according to the method for producing MnZn ferrite of the present invention, low core loss can be achieved in a wide temperature range.

What is claimed is:

1. A method for producing MnZn ferrite comprising Fe, Mn and Zn as main components, and Ca, Si and Co, and at least one selected from the group consisting of Ta, Nb and Zr as sub-components, comprising
a step of molding a raw material powder for said MnZn ferrite to obtain a green body, and
a step of sintering said green body;
said sintering step comprising a temperature-elevating step, a high-temperature-keeping step, and a cooling step;
said cooling step including a slow cooling step of cooling in a temperature range of 1100° C. to 1250° C. at a cooling speed of 0° C./hour to 20° C./hour for 1 hours to 20 hours, and
a cooling speed before and after said slow cooling step being higher than 20° C./hour;
said MnZn ferrite having a volume resistivity of 8.5 Ω·m or more at room temperature, an average crystal grain size of 7 μm to 15 μm and core loss of 420 kW/m³ or less between 23° C. and 140° C. at a frequency of 100 kHz and an exciting magnetic flux density of 200 mT.

2. The method for producing MnZn ferrite according to claim 1, wherein said high-temperature-keeping step is conducted at a keeping temperature of higher than 1250° C. and 1350° C. or lower in an atmosphere having an oxygen concentration of more than 0.2% by volume and 10% by volume or less.

3. The method for producing MnZn ferrite according to claim 2, wherein the concentration of oxygen in said cooling step is controlled so that the relationship between the concentration of oxygen P [$O_2$] (volume fraction) and temperature T (° C.) satisfies a formula:

log(P [$O_2$])=a−b/(T+273), wherein a is a constant of 6.4 to 11.5, and b is a constant of 10000 to 18000.

4. The method for producing MnZn ferrite according to claim 1, wherein the MnZn ferrite comprises Fe, Mn and Zn as main components, and Si, Ca and Co, and at least one selected from the group consisting of Ta, Nb and Zr as sub-components,
said main components comprising 53-54% by mol of Fe (calculated as $Fe_2O_3$), and 8.2-10.2% by mol of Zn (calculated as ZnO), the balance being Mn calculated as MnO, and
said sub-components comprising more than 0.001 parts by mass and 0.015 parts by mass or less of Si (calculated as $SiO_2$), more than 0.1 parts by mass and 0.35 parts by mass or less of Ca (calculated as $CaCO_3$), 0.4 parts by mass or less (not including 0) of Co (calculated as $Co_3O_4$), 0.1 parts by mass or less (including 0) of Ta (calculated as $Ta_2O_5$), 0.1 parts by mass or less (including 0) of Zr (calculated as $ZrO_2$), and 0.05 parts by mass or less (including 0) of Nb (calculated as $Nb_2O_5$), the total amount of $Ta_2O_5$, $ZrO_2$ and $Nb_2O_5$ being 0.1 parts by mass or less (not including 0), per 100 parts by mass in total of said main components (calculated as said oxides).

5. MnZn ferrite comprising 53-54% by mol of Fe (calculated as $Fe_2O_3$), and 8.2-10.2% by mol of Zn (calculated as ZnO), the balance being Mn (calculated as MnO), as main components, and
more than 0.001 parts by mass and 0.015 parts by mass or less of Si (calculated as $SiO_2$), more than 0.1 parts by mass and 0.35 parts by mass or less of Ca (calculated as $CaCO_3$), 0.4 parts by mass or less (not including 0) of Co (calculated as $Co_3O_4$), 0.1 parts by mass or less (including 0) of Ta (calculated as $Ta_2O_5$), 0.1 parts by mass or less (including 0) of Zr (calculated as $ZrO_2$), and 0.05 parts by mass or less (including 0) of Nb (calculated as $Nb_2O_5$), the total amount of $Ta_2O_5$, $ZrO_2$ and $Nb_2O_5$ being 0.1 parts by mass or less (not including 0), as sub-components, per 100 parts by mass in total of said main components (calculated as said oxides),
said MnZn ferrite having a volume resistivity of 8.5 Ω·m or more at room temperature, an average crystal grain size of 7 μm to 15 μm, core loss of 420 kW/m³ or less between 23° C. and 140° C. at a frequency of 100 kHz and an exciting magnetic flux density of 200 mT, and initial permeability μi of 2800 or more at a frequency of 100 kHz and at 20° C.

6. The MnZn ferrite according to claim 5, wherein said sub-components comprises more than 0.003 parts by mass and 0.012 parts by mass or less of Si (calculated as $SiO_2$), more than 0.1 parts by mass and 0.35 parts by mass or less of Ca (calculated as $CaCO_3$), and 0.2 parts by mass or more and 0.4 parts by mass or less of Co (calculated as $Co_3O_4$), and
said sub-components further comprises at least one selected from the group consisting of 0.015 parts by mass or more and 0.1 parts by mass or less of Ta (calculated as $Ta_2O_5$), 0.03 parts by mass or more and 0.1 parts by mass or less of Zr (calculated as $ZrO_2$), and 0.02 parts by mass or more and 0.05 parts by mass or less of Nb (calculated as $Nb_2O_5$), the total amount of $Ta_2O_5$, $ZrO_2$ and $Nb_2O_5$ being 0.1 parts by mass or less (not including 0), per 100 parts by mass in total of said main components (calculated as said oxides),
said MnZn ferrite having core loss of 400 kW/m³ or less at 23° C. at a frequency of 100 kHz and an exciting magnetic flux density of 200 mT.

* * * * *